J. W. McAULIFFE.
SANITARY TRAP.
APPLICATION FILED JULY 28, 1910.

997,309.

Patented July 11, 1911.

Witnesses:
Arthur F. Randall
John H. Parker

Inventor:
John W. McAuliffe
by Macleod Calver Copeland & Dike
Attys.

UNITED STATES PATENT OFFICE.

JOHN W. McAULIFFE, OF NEW YORK, N. Y., ASSIGNOR TO JOSEPH A. MAYNARD, OF BOSTON, MASSACHUSETTS.

SANITARY TRAP.

997,309.  Specification of Letters Patent.  Patented July 11, 1911.

Application filed July 28, 1910. Serial No. 574,266.

*To all whom it may concern:*

Be it known that I, JOHN W. MCAULIFFE, a citizen of the United States, residing at New York, county of New York, State of New York, have invented a certain new and useful Improvement in Sanitary Traps, of which the following is a specification, reference being had therein to the accompanying drawings.

This invention has reference to an improvement in sanitary traps which are used to maintain a water seal between a set bowl bath tub, or other fixture, and the waste pipe to which they are connected.

Sanitary traps are usually constructed of a soft metal such as lead for the body and a hard metal such as brass for the outlet pipe. In practice I find that a chemical action takes place on the lead and brass by the fluid in the trap, causing the brass outlet pipe to corrode through below the water line and break the seal of the trap, thus allowing the foul gases in the outlet pipe to rise through the trap and enter the premises.

My invention relates to that form of sanitary traps where the brass outlet pipe extends upward through the bottom into the lead body of the trap. As heretofore constructed the outlet pipe is in engagement with the bottom of the trap where the greatest chemical action takes place.

The object of my invention is to prevent corrosion of the outlet pipe below a line which will form a seal in the trap.

A further object of my invention is to secure the outlet pipe to the trap without the use of screw thread connections with the trap.

My invention consists in the peculiar and novel construction of a sanitary trap having a two part cylindrical body secured together by screwing the upper part forming the dome or cover into the lower part below the seal line of the trap, an inlet pipe extending into the side on a line with the bottom of the trap, a central cylindrical upward extension on the bottom of the trap having an inwardly extending annular lip on its upper end above the opening of the inlet pipe, and a two part outlet pipe extending upward through the central extension of the bottom of the trap, said outlet pipe having an outwardly extending annular oblique lip on its upper end, and means for clamping the annular lip on the central extension to the outlet pipe thus securing the outlet pipe to the trap without screw threading the trap and at a point above the opening of the inlet pipe, as will be more fully set forth hereinafter.

Figure 1:
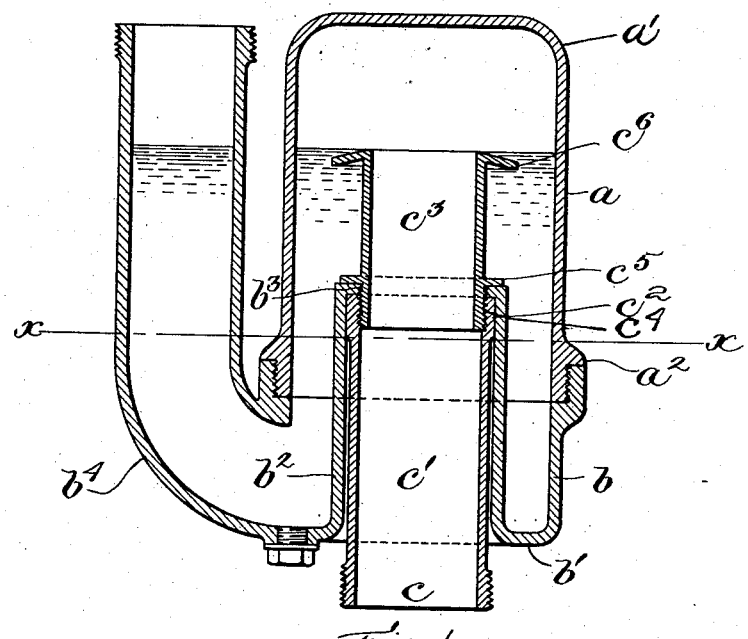
Figure 2:
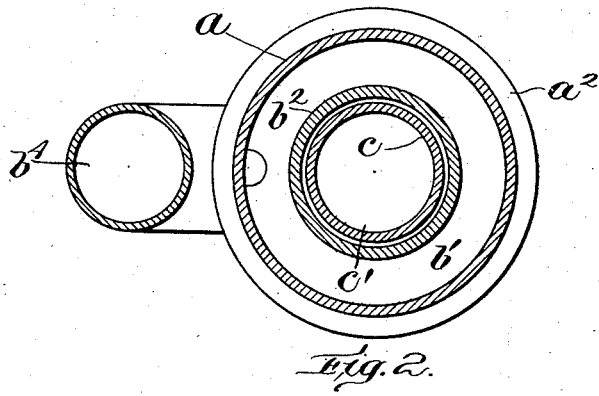

Figure 1 is a vertical sectional view of the trap taken on a line drawn centrally through the inlet and outlet pipes, and Fig. 2 is a transverse sectional view of the trap taken on line X—X of Fig. 1.

In the drawings, $a$ indicates the dome-shaped cover forming the upper cylindrical body and top $a'$ of the trap, and $b$ the lower cylindrical body portion forming the bottom $b'$ of the trap. The cover $a$ is secured by screwing it into the lower body portion $b$, the line of juncture being below the seal line of the trap as shown in Fig. 1. A flange $a^2$ on the cover ings, $a$ indicates the dome-shaped cover forming the upper cylindrical body and top $a'$ of the trap, and $b$ the lower cylindrical body portion forming the bottom $b'$ of the trap. The cover $a$ is secured by screwing it into the lower body portion $b$, the line of juncture being below the seal line of the trap as shown in Fig. 1. A flange $a^2$ on the cover forms a water tight joint. The inlet pipe $b^4$ enters the side of the lower body portion $b$ on a line with the bottom $b'$. Extending upward centrally from the bottom $b'$ is the cylindrical extension $b^2$ having its top formed into the inwardly extending annular lip $b^3$ on a line above the opening of the inlet pipe $b^4$. This extension $b^2$ is formed integral with the lower body portion $b$ of the trap. The outlet pipe $c$ consists of the lower tube $c'$ having the internal screw-threaded flanged upper end $c^2$ and the upper tube $c^3$ having the lower external screw-threaded end $c^4$, the outwardly extending annular flange $c^5$ and the outwardly extending annular oblique lip $c^6$ on its upper end in a position to form the seal line at the required height in the trap.

In securing the outlet pipe $c$ to the trap the lower tube $c'$ is pushed upward in the cylindrical extension $b^2$ until the upper end $c^2$ abuts on the lower face of the lip $b^3$. The upper tube $c^3$ is now placed into position and the lower end $c^4$ screwed into the upper end $c^2$ of the lower tube $c'$, bringing the flange $c^5$ onto the upper face of the lip $b^3$ and clamping the lip between the upper end of the lower tube and the flange on the upper tube, as shown in Fig. 1, thus forming a water tight joint above the opening of the inlet pipe and firmly securing the outlet pipe to the trap at a point above the opening of the inlet pipe without the use of screw threads in the trap.

In the operation of my improved sanitary trap the brass outlet pipe $c$ is protected from chemical action and corrosion by the lead extension $b^2$ of the trap to a point above the opening of the inlet pipe. If the upper tube $c^3$ of the outlet pipe $c$ should corrode through the side or at its juncture with the lead extension $b^2$ it would only lower the seal line to the top of the extension $b^2$ and would not break the seal of the trap. The tube $c^3$ can be easily replaced at a slight expense. The inrush of fluid through the inlet pipe $b^4$ scours the bottom and lower interior wall of the trap. The fluid now flows upward, around, and over the annular oblique lip $c^6$ and out through the outlet pipe $c$. The oblique lip $c^6$ quickly breaks the siphon and holds back a sufficient quantity of fluid in the trap to form a seal, level with the top of the outlet pipe, as shown in Fig. 1.

In the use of my improved sanitary trap the outlet pipe is protected against chemical action and corrosion to a point in the trap above a line that would form a water seal, thereby giving a more perfect action of the trap for a longer period than has heretofore been done.

What I claim is:

In a sanitary trap, the combination of a dome-shaped cover $a$ having the top $a'$ and the flange $a^2$ and forming the upper body portion, a lower body portion $b$ having the bottom $b'$, the inward cylindrical extension $b^2$ with the lip $b^3$ formed integral with the bottom $b'$ an inlet pipe $b^4$ and a two part outlet pipe $c$ consisting of a lower tube $c'$ having the internal screw threaded flange $c^2$ and an upper tube $c^3$ having the external screw-threaded end $c^4$, the flange $c^5$ and the annular lip $c^6$, as shown and described.

In testimony whereof I affix my signature, in presence of two witnesses.

JOHN W. McAULIFFE.

Witnesses:
WILLIAM A. MACLEOD,
ALICE H. MORRISON.

---

Copies of this patent may be obtained for five cents each, by addressing the "Commissioner of Patents, Washington, D. C."